United States Patent [19]
Yamamoto et al.

[11] Patent Number: 5,980,106
[45] Date of Patent: Nov. 9, 1999

[54] TEMPERATURE DETECTION CIRCUIT

[76] Inventors: Satoshi Yamamoto, 20-207, Minamisomeshi-machi, Wakabayashi-ku Sendai-shi, Miyagi 984-0814; Akira Hatakeyama, 11-2-310, Mizuhodai, Izumi-ku, Sendai-shi Miyagi, both of Japan

[21] Appl. No.: 09/064,075

[22] Filed: Apr. 22, 1998

[30] Foreign Application Priority Data

May 15, 1997 [JP] Japan .................................. 9-143279

[51] Int. Cl.⁶ ........................................................ G01K 7/00
[52] U.S. Cl. ................................................ 374/178; 323/907
[58] Field of Search .................................. 323/312, 315, 323/907; 374/178, 183; 327/512, 513, 538

[56] References Cited

U.S. PATENT DOCUMENTS

| | | | |
|---|---|---|---|
| 4,574,205 | 3/1986 | Nagano | 307/310 |
| 5,149,199 | 9/1992 | Kinoshita et al. | 374/178 |
| 5,519,354 | 5/1996 | Audy | 327/412 |
| 5,546,041 | 8/1996 | Szajda | 327/512 |
| 5,781,075 | 7/1998 | Bolton, Jr. et al. | 374/178 |

*Primary Examiner*—Matthew Nguyen
*Attorney, Agent, or Firm*—Robert D. Atkins

[57] ABSTRACT

A temperature detection circuit that minimizes the influence of variations due to manufacturing process and other factors, and can be used at high temperatures near its maximum usable temperature. According to the present invention, a temperature detection circuit is provided which comprises: a first current source coupled to a detection node; a second current source coupled in series to the first current source, and coupled to the detection node, the second current source having a temperature coefficient different from that of the first current source; and a detector coupled to the detection node.

12 Claims, 3 Drawing Sheets

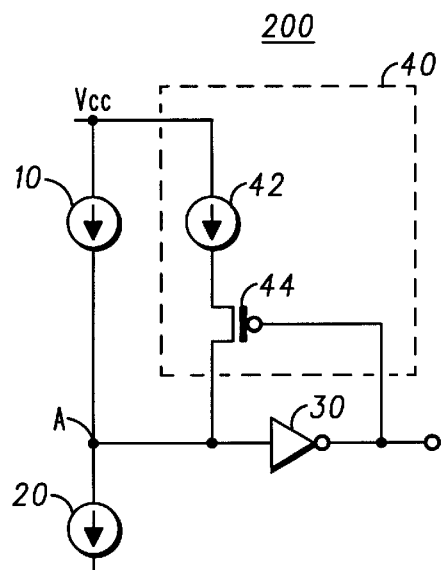
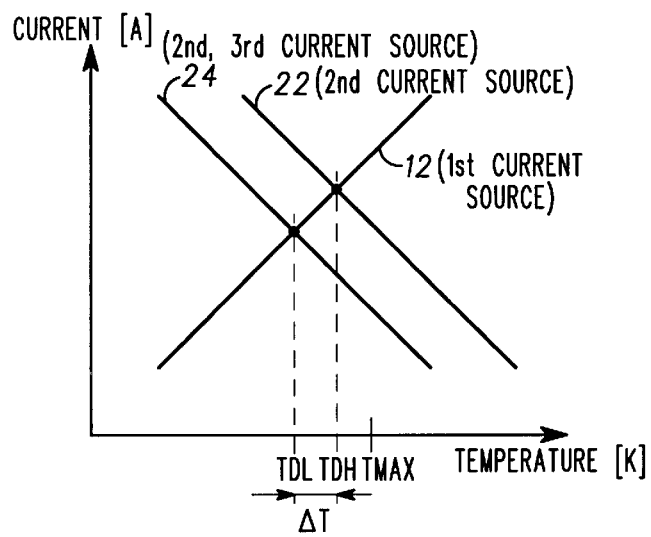
FIG.3A  FIG.3B
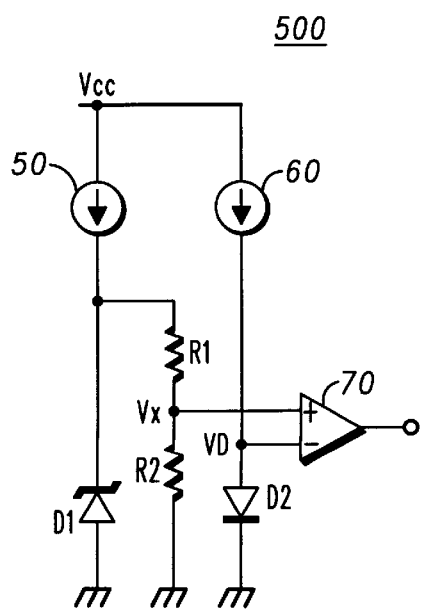
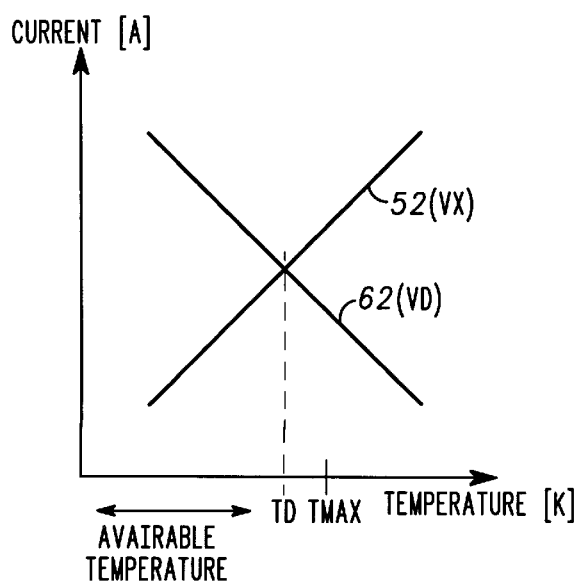
FIG.5A  FIG.5B

TEMPERATURE DETECTION CIRCUIT

FIELD OF THE INVENTION

The present invention relates to a temperature detection circuit. More specifically, the present invention relates to a temperature detection circuit in a protection circuit (for example, a thermal shutdown circuit) incorporated into a semiconductor chip.

BACKGROUND OF THE INVENTION

A prior art temperature detection circuit incorporated in a semiconductor chip is as shown in FIG. 5A. One end of current sources 50 and 60 is coupled to a power supply VCC. The other end of the current source 50 is coupled to one end of a zener diode D1 having a positive temperature coefficient. The other end of the zener diode D1 is coupled to a ground potential. The zener diode D1 is coupled in a reverse direction between the power supply 50 and ground potential. The voltage at the other end of the current source 50 is divided by resistors R1 and R2. The resistors R1 and R2 are coupled to a first detection node Vx. The other end of the current source 60 is coupled through a second detection node VD to one end of a diode D2 having a negative temperature coefficient. The other end of the diode D2 is connected to a ground potential. The diode D2 is coupled in a forward direction between the current source 60 and ground potential. An input of a comparator that outputs a detection signal is coupled to the first detection node Vx and second detection node VD.

This circuit operates as follows. First, under a normal condition, the semiconductor chip having the temperature detection circuit is within a usage temperature range below its maximum usable temperature TMAX (FIG. 5B). Reference numerals 52 and 62 in FIG. 5B denote the temperature dependency of the voltage at the first and second detection nodes Vx and VD, respectively. This circuit is designed so that the voltage at the second detection node VD is higher than that of the first detection node Vx under a normal operating condition. Thus, the output of the comparator 70 is at a high level. If the zener diode D1 having a positive temperature coefficient is used, the voltage at the first detection node Vx increases as the temperature of the semiconductor chip rises (52). On the other hand, because the diode D2 has a negative temperature coefficient, the voltage at the second detection node VD falls as the temperature of the semiconductor chip rises (62). When a sense (detection) temperature TD is reached where the voltages at the first detection node Vx and second detection node VD are equal, the output of the comparator 70 goes low, thereby detecting that a high temperature region exceeding a safely usable temperature has reached. Thereafter, an action, such as cooling the semiconductor chip in order to protect it against overheating, is taken as needed.

In this way, the sense temperature TD defines the temperature limit that permits the semiconductor chip and so forth to be used safely. As the sense temperature TD becomes higher, the usable temperature range also becomes wider accordingly; thus, a higher sense temperature TD is desirable for the user of the semiconductor chip and so forth. Because the temperature cannot be increased above the maximum usable temperature (breakdown temperature) TMAX, the sense temperature TD should desirably be smaller than the maximum usable temperature TMAX but as close as possible thereto.

However, when the temperature detection circuit or semiconductor chip of this type is produced in volume, there is variability due to variations in the manufacturing process, so that the sense temperature TD varies relative to its target value within a range having a certain margin. Thus, it is necessary to lower (move away) the target value sufficiently from the maximum usable temperature so that the maximum usable temperature TMAX is not exceeded even when the sense temperature TD varies. When the target value is lowered, the upper limit of the user-operable temperature is also lowered. As a result, it is difficult to meet the demand for devices and their overheat protection circuits that operate in a high temperature region, such as printer heads of inkjet printers.

In the circuit example described above, significant variations in the sense temperature occur due to variations in the zener voltage of the zener diode D1 and in the on-voltage of the diode D2. The present invention is intended to minimize the influence of variations in the manufacturing process and so forth and to provide a temperature detection circuit that can be operated in a high temperature range near its maximum usable temperature TMAX.

For use in a high temperature range near the maximum usable temperature, it is necessary to detect the sense temperature with greater accuracy than the prior art. This is because if the accuracy is poor, the sense temperature TD cannot be brought close to the maximum usable temperature TMAX. It is an objective of the present invention to provide a temperature detection circuit that detects the temperature with high accuracy.

In order to assure operating safety of the semiconductor chip having the temperature detection circuit, it should desirably have a hysteresis characteristic. It is an objective of the present invention to provide a temperature detection circuit that can readily incorporate a hysteresis characteristic.

Furthermore, because the zener voltage is typically above 5 volts, a power supply having a high voltage above 5 volts is required for the circuit shown in FIG. 5A. Thus, it is difficult to operate the circuit with a low voltage. It is an objective of the present invention to provide a temperature detection circuit that operates at a low voltage.

SUMMARY OF THE INVENTION

The above objectives can be met by a temperature detection circuit described below. The circuit comprises: a first current source coupled to a detection node; a second current source coupled in series to the first current source and coupled to the detection node, the second current source having a temperature coefficient different from that of the first current source; and a detector coupled to the detection node.

The above objectives can also be met by a circuit described below. The circuit comprises: a first current source coupled to a detection node; a second current source coupled in series to the first current source and coupled to the detection node, the second current source having a temperature coefficient different from that of the first current source; a detector having an input terminal coupled to the detection node and an output terminal for providing a detection signal; and a hysteresis circuit coupled to the output terminal and detection node, the hysteresis circuit comprising: a third current source; and a switch for supplying the current from the third current source to the detection node when the detection signal is at a predetermined signal level.

BRIEF DESCRIPTION OF THE DRAWINGS

FIG. 3A shows an embodiment where a circuit for providing hysteresis characteristics is incorporated into the temperature detection circuit according to the present invention.

FIG. 3B shows thermal characteristics of current sources.

FIG. 5A shows a prior art temperature detection circuit.

FIG. 5B shows thermal characteristics of current sources in a prior art.

DETAILED DESCRIPTION OF THE INVENTION

Figure 1A:
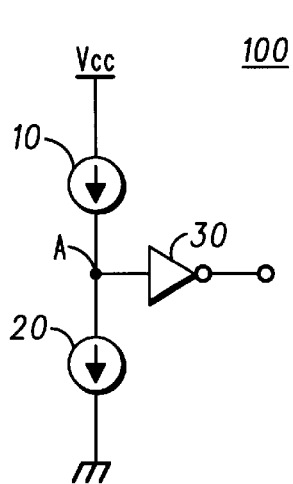
FIG. 1A shows one embodiment of a temperature detection circuit according to the present invention.

FIG. 1A shows an embodiment 100 of a temperature detection circuit according to the present invention. A first current source 10 is connected between a power supply potential VCC and a point A, while a second current source 20 is connected between point A and a ground potential. The first current source has a positive temperature potential, while the second current source 20 has a negative temperature coefficient. An input of an inverter 30 is connected to point A, and the output thereof provides a detection signal. The first and second current sources 10 and 20 may be readily comprised of MOS or bipolar transistors. The temperature coefficients of the current sources may also be set at desired values by utilizing, for example, the temperature dependency of thermal current in a transistor.

Figure 1B:
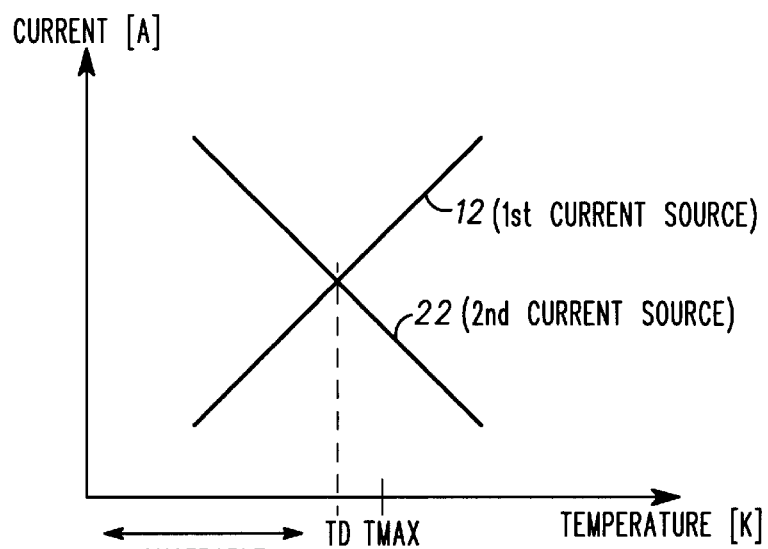
FIG. 1B shows thermal characteristics of current sources.

This circuit operates as follows. First, under a normal operating condition, a semiconductor chip having the temperature detection circuit is within a usage temperature range below its maximum usable temperature TMAX (FIG. 1B). Reference numerals 12 and 22 in FIG. 1B denote temperature characteristics of the first current source 10 and second current source 20, respectively. Unlike FIG. 5B for the prior art, the vertical axis denotes the magnitude of current. That is, under the normal operating condition, the current (22) flowing from the second current source 20 is greater than the current (12) flowing from the first current source 10, so that the potential at point A is low. Thus, the output of the inverter 30 is at a high level. Because the first current source 10 has a positive temperature coefficient, the current flowing from the first current source 10 increases as the temperature of the semiconductor chip rises (12). On the other hand, because the second current source 20 has a negative temperature coefficient, the current flowing from the second current source decreases as the temperature of the semiconductor chip rises (22). As a result, the potential at point A also increases. When a sense temperature TD is reached where the current flowing from the first current source 10 and the current flowing from the second current source 20 are equal, the potential at point A is greater than a threshold voltage of the inverter 30. As a result, the output of the inverter 30 goes low, thereby detecting that the semiconductor chip has entered a high temperature region that exceeds its safely usable temperature. That is, the output of the inverter 30 varies in response to changes in the magnitude relationship between the current values from the first and second current sources. Subsequently, an action, such as cooling the semiconductor chip in order to protect it against overheating, is taken as needed.

In this way, unlike the prior art (FIG. 5), the temperature detection circuit 100 can detect the sense temperature TD without using zener diode D1 and diode D2. Because the zener diode and diode are not used, variations associated with the manufacture of such devices will not occur. Thus, the sense temperature TD can be set close to the maximum usable temperature TMAX. As a result, the usable temperature range for semiconductor chips and so forth that incorporate the temperature detection circuit is extended. In the present embodiment, because the zener diode that requires a high-voltage power supply is not used, the circuit can be driven at a lower voltage.

Figure 2A:
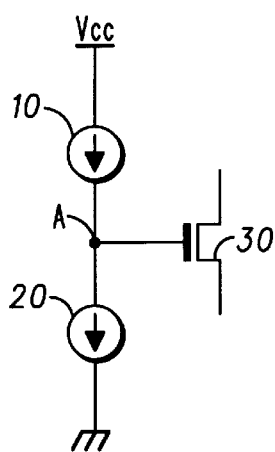
FIG. 2A shows another embodiment of the temperature detection circuit according to the present invention.
Figure 2B:
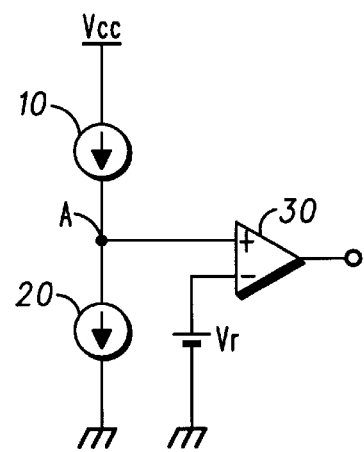
FIG. 2B shows another embodiment of the temperature detection circuit according to the present invention.

With the temperature detection circuit 100, the sense temperature is detected according to the temperature characteristics of the current sources 10 and 20. Because the current sources have high output impedance, minute changes in their current value associated with temperature changes lead to significant changes in voltage at point A. Thus, the gain of the output stage connected to point A need not be much high. With the prior art, the temperature is detected according to changes in voltage developed between diodes Vx and VD, and the resulting voltage change yields a weak signal; as such, the comparator 70 at the output stage needs to have a relatively high gain. In the present embodiment, because the gain of the output stage may be small, the output stage of the temperature detection circuit 100 is comprised of the inverter 30 (FIG. 1A). This output stage may also be directly connected to a gate of a MOSFET, as shown in FIG. 2A, or may be comprised of a comparator, as shown in FIG. 2B.

In the present embodiment, because minute changes in current value associated with temperature changes lead to significant changes in voltage at point A, the temperature detection circuit 100 sensitively responds to changes in temperature near the sense temperature TD. Thus, the sense temperature TD can be detected with high accuracy.

Furthermore, with the temperature detection circuit 100, changes in temperature are not translated to changes in voltage across the diode, so that power consumption can be reduced.

The temperature detection circuit according to the present invention may be manufactured with any manufacturing process, either MOS FET or bipolar manufacturing processes. Below is described a case where the circuit is comprised of MOS FET for convenience of explanation.

FIG. 3A shows another embodiment 200 of a temperature detection circuit according to the present invention. Like reference numerals in FIG. 1 denote similar parts. In this embodiment, a circuit 40 is added which provides a hysteresis characteristic to the temperature detection circuit. A third current source 42 having a negative temperature coefficient is connected between a power supply VCC and one end of a switch 44. The temperature coefficient of the third current source 42 may be the same as that of the second current source 20. The other end of the switch 44 is connected to a point A. A gate that controls the actuation of the switch 44 is connected to an output terminal of the temperature detection circuit.

The temperature detection circuit 20 operates as follows. First, under a normal operating condition, the semiconductor chip having the temperature detection circuit is within a usage temperature range below its maximum usable temperature TMAX (FIG. 3B). Reference numerals 12 and 22 in FIG. 3B denote temperature characteristics of the first current source 10 and second current source 20, respectively. Under the normal operating condition, the current (22)

flowing from the second current source 20 is greater than the current (12) flowing from the first current source 10, so that the potential at point A is low. Thus, the output of the inverter 30 is at a high level. This high-level signal is also provided to the gate of the switch 44, which is in a nonconductive state. Thus, the hysteresis circuit 40 is not operative. Because the first current source 10 has a positive temperature coefficient, the current flowing from the first current source 10 increases as the temperature of the semiconductor chip rises (12). On the other hand, because the second current source 20 has a negative temperature coefficient, the current flowing from the second current source decreases as the temperature of the semiconductor chip rises (22). As a result, the potential at point A also increases. When a sense temperature is reached where the current flowing from the first current source 10 and the current flowing from the second current source 20 are equal, the potential at point A is greater than a threshold voltage of the inverter 30. As a result, the output of the inverter 30 goes low, thereby detecting that the semiconductor chip has entered a high temperature region close to the maximum usable temperature TMAX. That is, the output of the inverter 30 varies in response to changes in the magnitude relationship between the current values from the first and second current sources.

A low-level detection signal is also provided to the gate of the switch 44, which becomes conductive, while the current from the third current source is provided to point A. As a result, the second and third current sources 20 and 42 having a negative temperature coefficient cause the temperature characteristic denoted by 22 to switch to that indicated by 24. As the temperature characteristic changes from 22 to 24, the sense temperature lowers to TDL, which is less than TDH by delta T. Thus, the normal operating condition will not be resumed even after the temperature returns to TDH as the semiconductor chip reaches a high temperature to detect the sense temperature TDH and is then cooled in order to protect it against overheating. When the temperature lowers to TDL, which is lower than TDH by delta T, by continued cooling, the normal operating condition is resumed. That is, the output of the inverter 30 varies in response to changes in the magnitude relationship between the current value from the first current source and the current value from the second and third current sources.

Thus, according to the present invention, the hysteresis capability may be readily added, thereby ensuring operational safety of semiconductor chips and so forth that incorporate the temperature detection circuit.

Figure 4:
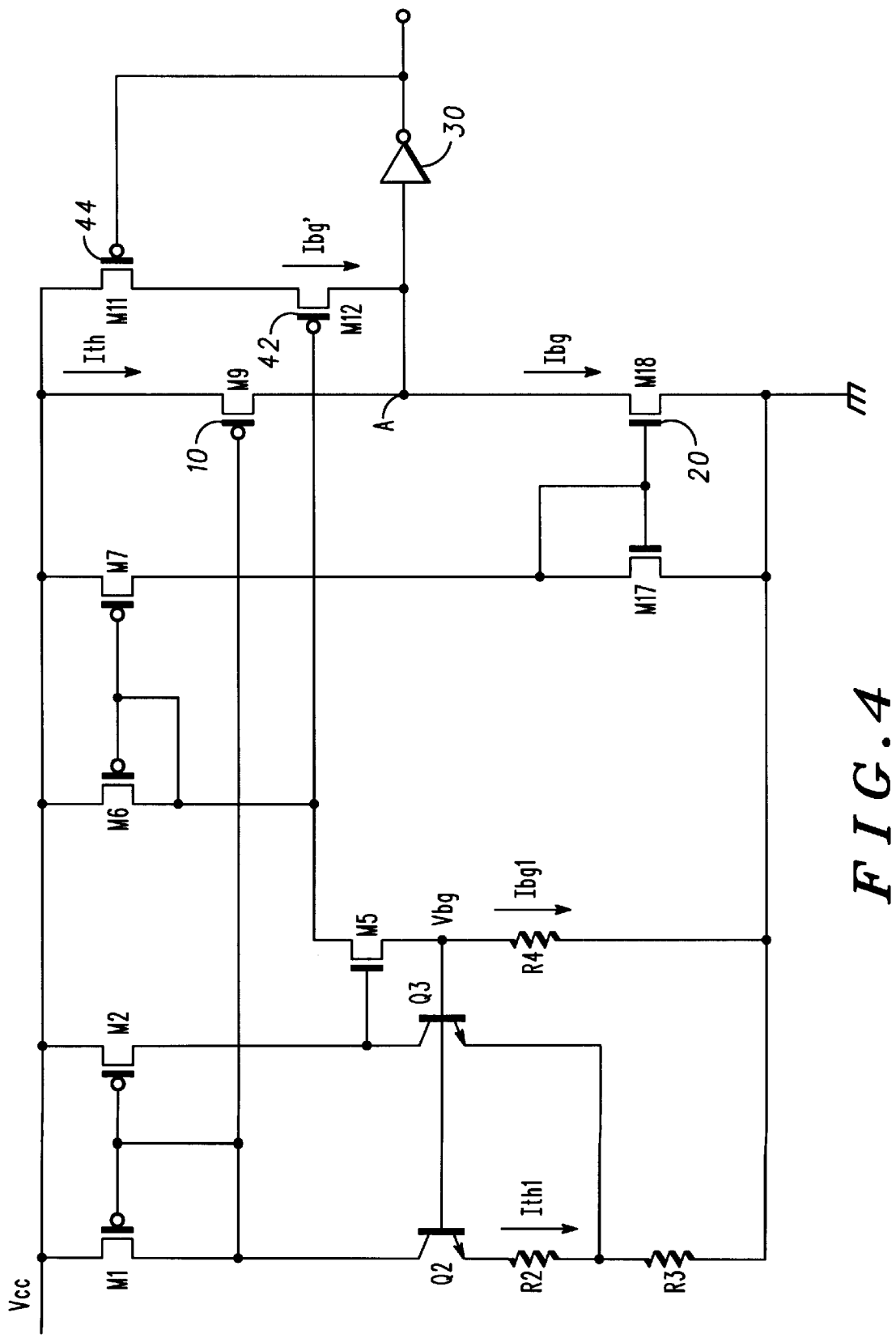
FIG. 4 shows a detailed embodiment of the temperature detection circuit according to the present invention.

Next, variability in the sense temperature TDH is considered according to the circuit configuration shown in FIG. 4. In FIG. 4, like reference numerals in FIGS. 1 through 3 denote similar parts. Base voltages of Q2 and Q3 are a bandgap voltage Vbg. This voltage is converted to current by a resistor R4. Here, the temperature coefficient of vbg is approximately zero. Because the resistor R4 typically has a positive temperature coefficient, the current Ibg1 flowing through R4 has a negative temperature coefficient. The current flowing through Q2 is determined by the emitter area ratio of Q2 and Q3 and resistor R2, and this current is expressed as Ith1. Assuming that the emitter area ratio of Q2 and Q3 is 4:1, then Ith1 is given by:

$$Ith1 = \frac{(VT)ln4}{R2} \qquad \text{Eq. (1)}$$

where (VT)=kT/q; k is Boltzmann's constant; T is absolute temperature; and q is the electron charge. If the temperature coefficient of R2 is smaller than that of (VT), Ith has a positive temperature coefficient. Ith1 is set by a current mirror circuit made up of transistors M1 and M9, and this current, if expressed as Ith, is given by:

$$Ith = k1 * Ith1 \qquad \text{Eq.(2)}$$

where k1 denotes a size ratio between the transistors M1 and M9. Furthermore, Ibg1 is set by current mirror circuits made up of transistors M6 and M7 and transistors M17 and M18 to Ibg, which is given by:

$$Ibg = k2 * k3 * IBG1 \qquad \text{Eq. (3)}$$

where k2 denotes a size ratio between transistors M6 and M7, and k3 denotes a size ratio between transistors M17 and M18. If the temperature of the semiconductor chip is the sense temperature TDH, then Ith=Ibg; thus, TDH may be expressed as follows, based on Eqs. (2) and (3):

$$k1 * Ith1 = k2 * k3 * Ibg1$$

$$k1 * \frac{(VT)ln4}{R2} = k2 * k3 * \frac{Vbg}{R4}$$

$$TDH = \frac{q}{k} * \frac{1}{ln4} * \frac{k2 * k3}{k1} * \frac{R2}{R4} * Vbg$$

Now assuming that:

$$n1 = \frac{k2 * k3}{k1}, n2 = \frac{R2}{R4}$$

then, the sense temperature TDH is as follows:

$$TDH = \frac{q}{k} * \frac{1}{ln4} * n1 * n2 * Vbg$$

In the above equation that represents the sense temperature TDH, q, k, ln4 are constants, and n1 does not have any temperature coefficient. If R2 and R4 have the same temperature coefficient, n2 does not have any temperature coefficient as well. Thus, in the present embodiment, variability in the sense temperature TDH is dependent solely on variability in the bandgap voltage Vbg. Generally, variability in the bandgap voltage Vbg can be made smaller than variability in zener diodes (D1, D2) as used in the prior art. Thus, in the present embodiment, variability in the sense temperature can be reduced as compared to the prior art.

Furthermore, variability in hysteresis width delta T (=TDH−TDL) may be considered as follows according to the circuit configuration shown in FIG. 4. With the circuit shown in FIG. 4, transistors M11 (44) and M12 (42) are used to provide a hysteresis characteristic. The hysteresis width delta T is set by the current Ibg' flowing through the transistor M12, and this current value is set by a mirror ratio of the current mirror circuit made up of the transistors M6 and M12. After the temperature of the semiconductor chip exceeds the sense temperature TDH, the sense temperature TDL upon returning to the normal operating mode may be determined by utilizing the relationship, Ith=Ibg−Ibg', as follows:

$$TDL = \frac{q}{k} * \frac{1}{ln4} * (n1 - n3) * n2 * Vbg$$

where n3 represents a size ratio between the transistors M6 and M12. n3 does not have any temperature coefficient. The hysteresis width delta T is expressed as follows:

$$\Delta T = \frac{q}{k} * \frac{1}{\ln 4} * n3 * n2 * Vbg$$

Thus, variability in the hysteresis width delta T is also dependent exclusively upon the bandgap voltage Vbg. Therefore, the present embodiment can reduce variability in the hysteresis width as compared to the prior art.

While the present invention has been described with reference to specific embodiments, it is not intended that the invention be limited thereto. Also while an explanation has been given regarding the high temperature region using, by way of example, the temperature detection circuit that provides overheat protection, the present invention may also apply if the similar condition is found in low temperature or other temperature regions.

We claim:

1. A temperature detection circuit (200), comprising:
a first current source (10) coupled to a detection node (A);
a second current source (20) coupled in series to the first current source, and coupled to the detection node, the second current source having a temperature coefficient different from that of the first current source (10);
a detector (30) having an input terminal coupled to the detection node (A) and an output terminal for providing a detection signal; and
a hysteresis circuit (40) coupled to the output terminal of the detector (30) and the detection node (A), the hysteresis circuit (4) comprising:
a third current source (42); and
a switch (44) for supplying current from the third current source (42) to the detection node (A) when the detection signal level is in a predetermined range of signal level.

2. A temperature detection circuit according to claim 1, wherein the detector (30) provides a detection signal of a predetermined signal level in response to changing relationship in magnitude between a first current value flowing from the first current source (10) and a second current value flowing from the second current source (20).

3. A temperature detection circuit (200) according to claim 2, wherein the temperature coefficient value of the first current source (10) has a sign different from those of the second current source (20) and third current source (42).

4. A temperature detection circuit (200) according to claim 3, wherein the first current source (10) has a positive temperature coefficient value, while the second current source (20) and third current source (42) have a negative temperature coefficient.

5. A temperature detection circuit (200) according to claim 2, wherein the first current source (10) has a positive temperature coefficient value, while the second current source (20) and third current source (42) have a negative temperature coefficient.

6. A temperature detection circuit (200) according to claim 1, wherein the temperature coefficient value of the first current source (10) has a sign different from those of the second current source (20) and third current source (42).

7. A temperature detection circuit (200) according to claim 6, wherein the first current source (10) has a positive temperature coefficient value, while the second current source (20) and third current source (42) have a negative temperature coefficient.

8. A temperature detection circuit (200) according to claim 1, wherein the first current source (10) has a positive temperature coefficient value, while the second current source (20) and third current source (42) have a negative temperature coefficient.

9. A temperature detection circuit (200), comprising:
a first current source (10) coupled to a detection node (A)
a second current source (20) coupled in series to the first current source, and coupled to the detection node (A), the second current source having a temperature coefficient different from that of the first current source (10);
a detector (30) having an input terminal coupled to the detection node (A) and an output terminal for providing a detection signal, the detector providing a detection signal of a predetermined level to the output terminal in response to changing relationship in magnitude between a first current value flowing from the first current source (10) and a second current value flowing from the second current source (20); and
a hysteresis circuit (40) coupled between the output terminal and the detection node (A), the hysteresis circuit (40) comprising:
a third current source (42); and
a switch (44) for supplying current from the third current source (42) to the detection node (A) in response to signal outputted from the detector,
wherein the detector (30) outputs the detection signal of a predetermined level in response to changing relationship in magnitude between the first and second current values, or changing relationship in magnitude between the third and second current values.

10. A temperature detection circuit (200) according to claim 9, wherein the temperature coefficient value of the first current source (10) has a sign different from those of the second current source (20) and third current source (42).

11. A temperature detection circuit (200) according to claim 10, wherein the first current source (10) has a positive temperature coefficient value, while the second current source (20) and third current source (42) have a negative temperature coefficient.

12. A temperature detection circuit (200) according to claim 9, wherein the first current source (10) has a positive temperature coefficient value, while the second current source (20) and third current source (42) have a negative temperature coefficient.

* * * * *